(12) United States Patent
Srinivasan (10) Patent No.: US 9,973,418 B2
(45) Date of Patent: May 15, 2018

(54) TECHNIQUES FOR CHANGE PROPAGATION ACROSS BROKER TERRITORIES

(71) Applicant: Software AG, Darmstadt (DE)

(72) Inventor: Preetha Srinivasan, Bangalore (IN)

(73) Assignee: SOFTWARE AG, Darmstadt (DE)

(*) Notice: Subject to any disclaimer, the term of this patent is extended or adjusted under 35 U.S.C. 154(b) by 519 days.

(21) Appl. No.: 14/077,964

(22) Filed: Nov. 12, 2013

(65) Prior Publication Data

US 2015/0134750 A1    May 14, 2015

(51) Int. Cl.
*H04L 12/753* (2013.01)
*H04L 12/26* (2006.01)
*H04L 12/24* (2006.01)

(52) U.S. Cl.
CPC ............ *H04L 45/48* (2013.01); *H04L 41/069* (2013.01); *H04L 41/0686* (2013.01); *H04L 43/0817* (2013.01); *H04L 43/10* (2013.01)

(58) Field of Classification Search
CPC ...... G06Q 10/107; H04L 12/585; H04L 12/58
See application file for complete search history.

(56) References Cited

U.S. PATENT DOCUMENTS

| 8,136,122 B2 | 3/2012 | Holar et al. | |
|---|---|---|---|
| 2005/0216559 A1* | 9/2005 | Manion et al. | 709/205 |
| 2012/0158924 A1* | 6/2012 | Miyao | 709/220 |

FOREIGN PATENT DOCUMENTS

| EP | 0 868 098 | 9/1998 |
|---|---|---|
| EP | 2 442 265 | 4/2012 |

OTHER PUBLICATIONS

IDN Knowledge Xchange: IDN Blog, "Configuring Territories," Jan. 16, 2012, pp. 1-5. http://idnxchange.com/webmethods-blogs/configuring-territories.html.
Wikipedia—Computer Cluster, retrieved Nov. 12, 2013, pp. 1-7. http://en.wikipedia.org/wiki/Computer_cluster.
Software AG, "Administering webMethods Broker," Version 8.0, Dec. 2009, pp. 1-508.

* cited by examiner

*Primary Examiner* — Vivek Srivastava
*Assistant Examiner* — Hien Doan
(74) *Attorney, Agent, or Firm* — Nixon & Vanderhye PC (57) ABSTRACT

Certain example embodiments described herein relate to techniques for propagating changes across broker territories. Broker territories are formed from broker servers that are placed in different geographical locations. When a territory is formed, a minimum spanning tree (MST) is formed between the brokers in the territory and, as a result, every broker in the territory will know its nearest neighbors and will be able to propagate the changes to these brokers. The MST may be dynamic in certain example embodiments. Each broker may be configured to calculate the cost of the edges based on certain predefined parameters, e.g., in computing the MSTs. Parameters that may be used in determining edge weights may include, for example, response to ping, geographical distance, whether a broker is in a LAN versus in a WAN, whether brokers are embedded in a mobile device, predefined categories (e.g., based on device type, etc.), and/or the like.

20 Claims, 7 Drawing Sheets

TECHNIQUES FOR CHANGE PROPAGATION ACROSS BROKER TERRITORIES

TECHNICAL FIELD

Certain example embodiments described herein relate to application integration techniques using brokers. More particularly, certain example embodiments described herein relate to techniques for propagating changes across broker territories.

BACKGROUND AND SUMMARY OF EXAMPLE EMBODIMENTS OF THE INVENTION

Companies today are tasked with implementing solutions for many types of integration challenges within their respective enterprises. Many of these challenges involve issues of application integration (e.g., integration among and/or between software applications and/or other systems) and fall into common patterns.

For example, a first area relates to propagation of similar business objects from one system to multiple other systems, such as, for example, in an order status change or a product price change. A second area relates to synchronization of similar business objects between two or more systems to obtain a single view, such as, for example, a real-time synchronization of customer, product registration, product order, and product SKU information among several applications. This is one of the most common issues requiring an integration solution. In a one-way synchronization, there generally is one system (e.g., resource) that acts as a data source and one or more resources that are targets of the synchronization. In a two-way synchronization, every resource often is both a potential source and target of a synchronization. There generally is not a single resource that acts as the primary data resource. Thus, a change to any resource should be reflected in all other resources. A third area involves information joined from multiple sources into a common destination system, such as, for example, communicating pharmacy customer records and prescription transactions and website data into a central application and database.

Various tools have been provided that enable a user to design and deploy solutions that address these challenges using, for example, the publish-and-subscribe model or one of its variants. The publish-and-subscribe model is a specific type of message-based solution in which messages are exchanged anonymously through a message broker. Applications that produce information that needs to be shared make this information available in specific types of recognizable documents that they publish to the message broker. Applications that require information subscribe to the document types they need.

At run time, the message broker receives documents from publishers and then distributes the documents to subscribers. The subscribing application processes or performs work using the document and may or may not send a response to the publishing application.

In a typical system, an integration server or applications running on an integration server publish documents to a broker. The broker then routes the documents to subscribers located on other integration servers. The integration server and the broker share a fast, efficient process for exchanging documents across the entire system.

Brokers can be linked to form units known as territories, and brokers that form a territory may sometimes function as a single logical broker. Clients that connect to one broker in a territory can automatically exchange documents with clients connected to any of the brokers in the territory. Territories can be organized in any desired way, e.g., to take into account factors such as, for example, geographical distribution of clients and/or back-end services, the types of services offered, actual and/or expected traffic, actual and/or expected processing loads, etc. Territories thus may help support scalability by allowing one to segment traffic among multiple brokers, while still treating the brokers as a single operational unit.

When brokers operate in a territory, they maintain the same set of document types and client group definitions. Typically, these objects are initially synchronized when a broker joins a territory. Any changes that occur to these objects on one broker should be automatically propagated to the other brokers in the territory. In other words, after a broker becomes a member of a territory, it then is responsible for notifying its peers of any changes that occur to its own document types or client groups.

When a given broker in a territory receives such a notification, it immediately applies the change to its own metadata. Because these metadata changes are self-propagating, one can make a change to a document type or client group on any broker and expect that change to automatically be applied to all brokers in the territory. Every broker in a territory therefore should have knowledge about the other brokers, at least in that specific territory. For example, as indicated above, when a change occurs to client groups or document types in a broker, that broker initiates a connection with all other brokers and propagates the changes.

Unfortunately, however, the entire responsibility for propagating the change lies with the single broker. It thus follows that propagation delays, failures, and other problems with the network and/or that individual broker may cause the synchronization between brokers to be lost.

Thus, it will be appreciated that there is a need in the art for improving synchronization among brokers in and across territories.

Certain example embodiments address this problem by calculating and/or making use of an optimized (e.g., shortest) route for propagation. Using the shortest route, for example, should at least in theory help ensure that the number of propagation operations is at a minimum. A single broker may propagate the same update to several other brokers, thereby reducing the overall bandwidth required.

In certain example embodiments, broker territories are formed from broker servers that are placed in different geographical locations. When a territory is formed, a least cost tree (also sometimes referred to as a minimum spanning tree or MST) is formed between the brokers in the territory and, as a result, every broker in the territory will know its nearest neighbors and will be able to propagate the changes to these brokers.

It thus will be appreciated that certain example embodiments lack a master-slave relationship as between the brokers in a territory. In this way, the brokers are all in a sense "equal" in that, for example, they all have the same responsibilities when it comes to propagating updates.

One aspect of certain example embodiments relates to having each broker calculate and updates its own minimum spanning tree, purely to determine its nearest neighbor based on the configurable criteria. The actual minimum spanning tree calculation may be performed using any suitable algorithm. The metadata flow associated with the calculations may be dynamic and work automatically between equal brokers, contrary to typical master-slave approaches.

Example advantages include reliability of propagation and bandwidth optimization.

In certain example embodiments, the least cost tree may be dynamic, and/or each broker may be configured to calculate the cost of the edges based on certain predefined parameters.

In certain example embodiments, there is provided a method of managing operations of a computer network in which a plurality of broker servers located at different respective geographical locations are divided into one or more distinct broker server territories. At each broker server in each said territory, a nearest neighbor is calculated as if the respective broker server were a node in a minimum spanning tree for its territory. Brokered messaging and/or service provision is enabled using the broker servers in the computer network. In response to a change being made to one of said broker servers, a message indicative of the change to each of the broker servers is propagated by causing each said broker server, starting with the changed broker server, to distribute the message indicative of the change to its respective nearest neighbor broker server, in managing the computer network.

In certain example embodiments, a computer-mediated network system is provided. Brokers are located at different respective geographical locations, with the brokers being divided into one or more distinct broker territories. Each said broker comprises processing resources including at least one processor and a memory. The processing resources for each said broker being configured to: calculate a nearest neighbor as if the respective broker were a node in a minimum spanning tree for its territory; cause the respective broker to cooperate with other brokers in its territory in order to provide brokered messaging and/or services to requesting client computer systems; and distribute a message indicative of a change to one of said brokers in its territory to the broker that is considered its respective nearest neighbor.

In certain example embodiments, there is provided a first broker server for use in a computer-mediated network system comprising a plurality of broker servers located at different respective geographical locations and being divided into one or more distinct broker server territories. The first broker server comprises at least one computer processor; a memory; and instructions stored on a non-transitory computer readable storage medium, performable in connection with the at least one computer processor and the memory. The instructions are performable to at least: calculate a nearest neighbor as if the first broker server were a node in a minimum spanning tree for its territory; cause the first broker server to cooperate with other broker servers in its territory to provide brokered messaging and/or services to requesting client computers; receive a direct change command from an authorized user; in response to a received direct change command, distribute a message indicative of the received direct change command to a second broker server that is considered the first broker server's nearest neighbor, so that the second broker server is updated and caused to distribute the message indicative of the received direct change command to a third broker server in its territory that is considered the second broker server's respective nearest neighbor, in propagating the direct change command through the territory; receive a indirect change command from an authorized user via an intermediary broker server; and in response to a received indirect change command, distribute a message indicative of the received indirect change command to a second broker server that is considered the first broker server's nearest neighbor, so that the second broker server is updated and caused to distribute the message indicative of the received indirect change command to a third broker server in its territory that is considered the second broker server's respective nearest neighbor, in propagating the indirect change command through the territory. No master-slave relationships exist as between broker servers in the territory for purposes of propagating changes made to the broker servers.

In certain example embodiments, there is provided there is provided a method of operating a computer network in which a plurality of broker servers located at different respective geographical locations are divided into one or more distinct broker server territories. In response to a change being made to one of said broker servers, a message indicative of the change is propagated to each of the broker servers by causing each said broker server, starting with the changed broker server, to distribute the message indicative of the change to a broker server that would be considered its nearest neighbor if a minimum spanning tree algorithm were computed considering each broker server to be a node in the minimum spanning tree. No master-slave relationships exist as between broker servers in the territory for purposes of propagating changes made to the broker servers. Edge weights for the minimum spanning tree are based on one, two, or more of the following and/or other factors: ping time responses between connected broker servers pairs; geographical distances between connected broker servers pairs; whether connected broker server pairs are either in a common LAN or separated by a WAN; whether connected broker server pairs are either mobile or stationary; and whether connected broker server pairs belong to a common one of a plurality of predefined categories.

In certain example embodiments, there are provided non-transitory computer readable storage mediums tangibly storing instructions that, when executed by at least one processor of a system, perform the above-described and/or other methods.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

A description of an illustrative application integration system and its example methods of operation will now be provided. It will be appreciated that the following description is provided by way of example and without limitation. Indeed, the implementations set forth below reflect the general techniques associated with one publish-and-subscribe approach to providing application integration solutions developed by the assignee of the instant application, which may be used in connection with the messaging layer, triggers, and trigger subsystems of certain example embodiments. It is noted, however, that the embodiments of the invention are not limited to this specific architecture, these example techniques, or even the publish-and-subscribe approach generally.

Figure 1:
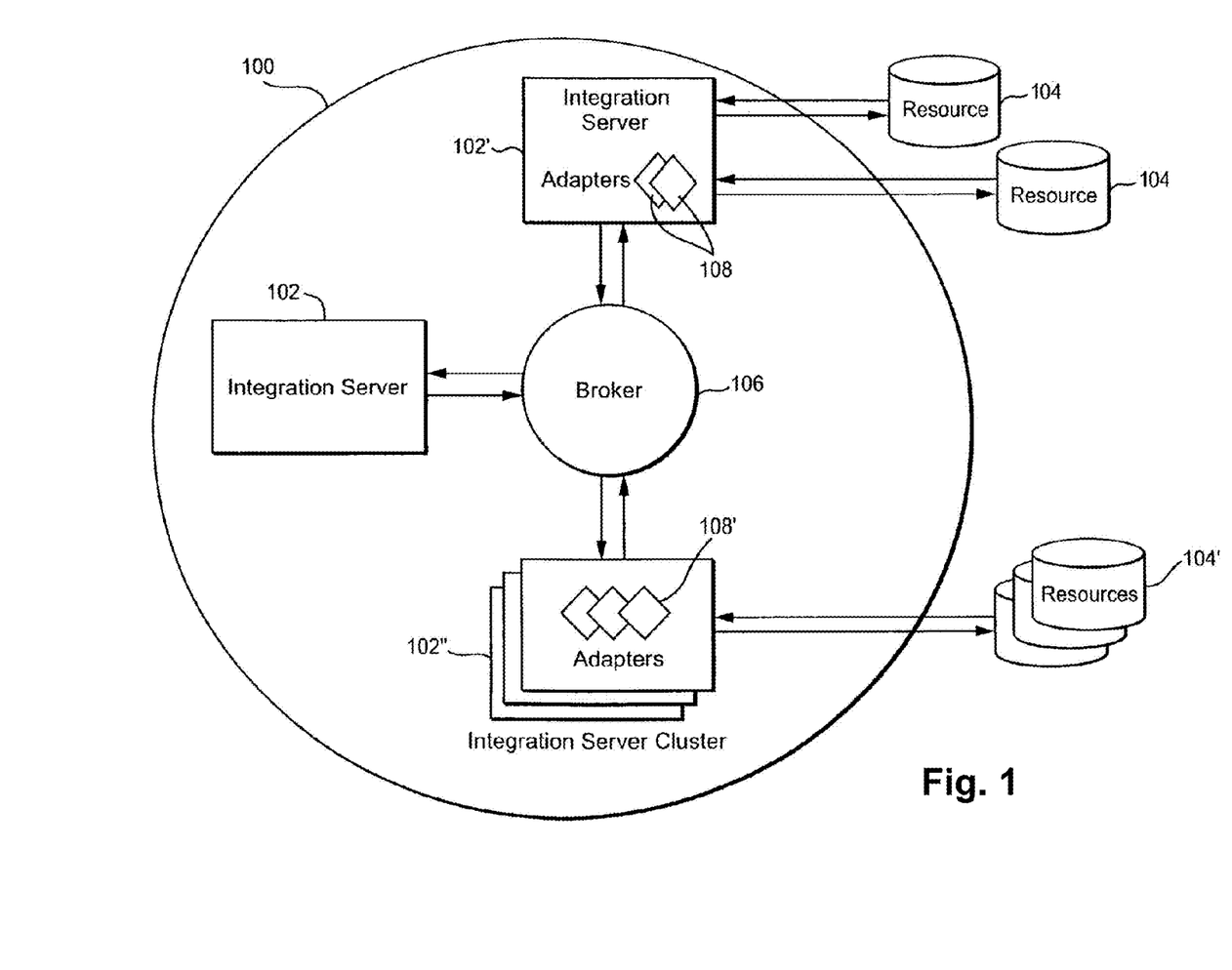
FIG. 1 is a schematic view of an illustrative application integration system.

Referring now more particularly to the drawings, FIG. 1 is a schematic view of an illustrative application integration system 100. A plurality of integration servers 102 are shown, each being in communication with a broker 106. A first integration server 102 is shown, as is a second integration server 102', which includes a plurality of adapters 108. An integration server cluster 102" also is shown, and it includes a plurality of adapters 108' provided thereto.

In general, the integration server is the system's central run-time component. It serves as the entry point for the systems and applications to be integrated, and it is the system's primary engine for the execution of integration logic. It also provides the underlying handlers and facilities that manage the orderly processing of information from resources 104 (or clustered resources 104') inside and/or outside the enterprise. The integration server 102 publishes documents to and receives documents from the broker.

The broker 106 forms the potentially globally scalable messaging backbone of the example components described herein. It provides the infrastructure for implementing asynchronous, message-based solutions that are built on the publish-and-subscribe model or one of its variants, such as, for example, request/reply, publish-and-wait, and the like.

The broker 106 routes documents between information producers (e.g., publishers) and information consumers (e.g., subscribers). Thus, the broker 106 receives, queues, and delivers documents. The broker 106 maintains a registry of document types that it recognizes. It also maintains a list of subscribers that are interested in receiving those types of documents. When the broker 106 receives a published document, it queues it for the subscribers of that document type. Subscribers retrieve documents from their queues. This action usually triggers an activity on the subscriber's system that processes the document.

The basic building blocks of an integration solution that uses the publish-and-subscribe model include, for example, documents, publishable document types, triggers, services, adapter notifications, and canonical documents. These basic building blocks are described, for example, in U.S. Pat. No. 8,136,122, the entire contents of which are hereby incorporated herein by reference. The '122 patent also provides an overview of illustrative publish-and-subscribe paths that may be used in connection with certain example embodiments.

Multiple brokers 106 optionally may be provided to a system 100. Multiple brokers 106 can operate in groups, called territories, which allow several brokers 106 to share document type and subscription information, e.g., as alluded to above.

In view of the foregoing, it will be appreciated that brokers are not simply routers in certain example embodiments.

In certain example embodiments, broker territories are formed from broker servers that are placed in different geographical locations. When a territory is formed, a least cost tree (also sometimes referred to as a minimum spanning tree or MST) is formed between the brokers in the territory and, as a result, every broker in the territory will know its nearest neighbors and will be able to propagate the changes to these brokers. The least cost tree or minimum spanning tree may be dynamic in certain example embodiments.

A spanning tree T of a connected, undirected graph G is a tree composed of all the vertices and at least some of the edges of G. A spanning tree of a connected graph G can also be defined as a maximal set of edges of G that contains no cycles, or as a minimal set of edges that connect all vertices. A minimum spanning tree is a spanning tree with weight less than or equal to the weight of every other spanning tree.

In certain example embodiments, each broker may be configured to calculate the cost of the edges based on certain predefined parameters, e.g., in computing a minimum spanning tree. Example parameters that may be used in determining edge weights may include, for example, response to ping, geographical distance, whether a broker is in a LAN versus in a WAN, whether brokers are embedded in a mobile device, predefined categories (e.g., based on device type, etc.), and/or the like. In certain example embodiments, these and/or other parameters may be used individually and/or in any suitable combination or sub-combination. Further detail concerning each of the above-listed example parameters will now be provided.

Response to Ping:

The cost of route may be the determined by the response time to a ping. For example, when a broker joins a territory, it may determine whether it can obtain a connection to other brokers in the territory, e.g., by sending out "Hello" messages to the other brokers. The other brokers may respond to the request with an acknowledgment. The time taken to receive this acknowledgement can be used as the cost of the route between the brokers. Variants of this approach may include repeating this process a predetermined number of times and using the average, median, minimum, maximum, or other time as the cost.

Geographical Distance:

The cost of route may be the distance between the geographical locations at which the brokers exist. This information can be configured during installation of the broker, for example. Alternatively, or in addition, geographical distance information may be updated over time, and potentially automatically, if some or all of the brokers are provided on mobile devices. In such cases, costs may be recomputed on a periodic basis, upon the occurrence of a predefined event (e.g., a new broker being added, a partial or complete system failure, when manually initiated, etc.), and/or the like. Metadata associated with the brokers may indicate whether they are portable or the like.

Figure 2:
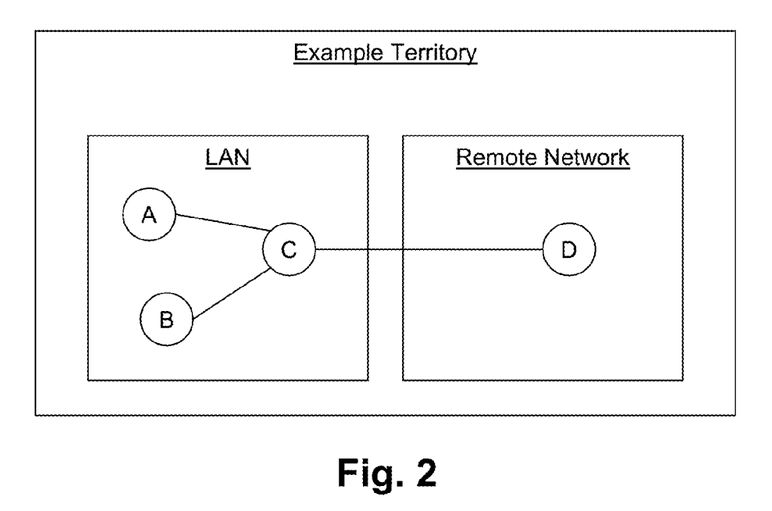
FIG. 2 helps illustrate how a minimum spanning tree can be developed, taking into account whether brokers are located in a LAN or in a WAN, in accordance with certain example embodiments.

Differentiate Between Brokers in a LAN and Brokers in a WAN:

It also is possible to differentiate between brokers in the same LAN, brokers over WAN, etc. A given broker in certain example embodiments may assign less cost to brokers in its LAN and more to those over WAN, e.g., as communications within a LAN typically will be faster than communications mediated by a WAN. Consider four Brokers A, B, C, and D in a territory, and assume that a tree is constructed as shown in FIG. 2. In accordance with the FIG. 2 tree, broker A and broker B may send update events to broker C, which would forward it across the remote network to broker D. Broker D may not send update events to all of brokers A, B, and C, because it is remote from the WAN.

Brokers Embedded within a Mobile Device:

When one or more brokers in the territory are embedded within at least mobile device and the at least one mobile device is in motion, the distance between the two brokers may be calculated. The formula may be: $\sqrt{(xA-xB)^2+(yA-yB)^2}$, where (xA, yA) and (xB, yB) are coordinates of broker A and broker B, respectively. In certain example embodiments, a third coordinate may be added and a corresponding distance formula may be used. The positions may be exchanged between brokers during the initial "Hello" handshake in certain example embodiments. If the devices are GPS enabled, GPS coordinates may be exchanged. Cellular, wireless, and/or other triangulation location calculations and/or estimations may be used in addition, or in the alternative.

Figure 3:
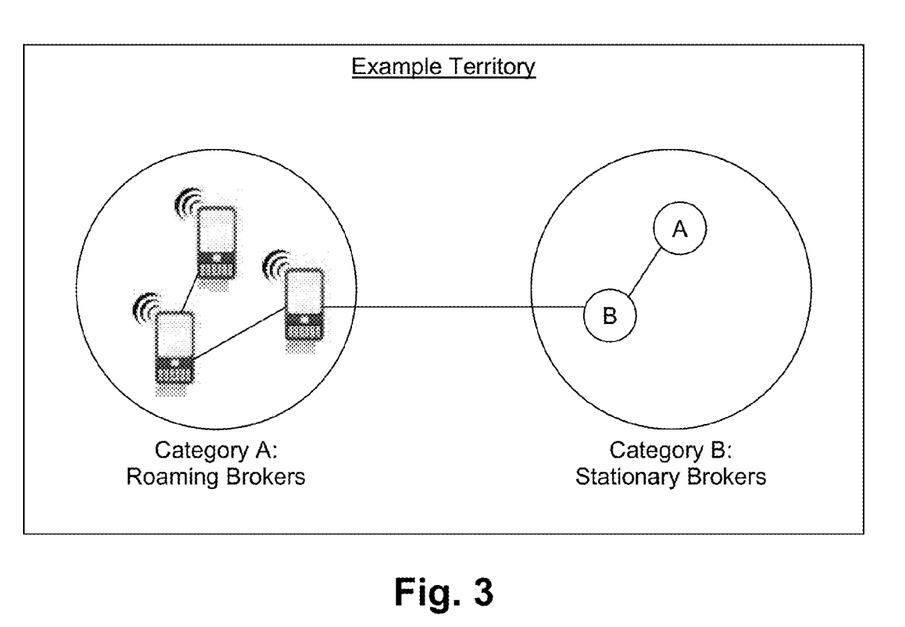
FIG. 3 helps illustrate how a minimum spanning tree can be developed, taking into account whether brokers are located on portable devices or stationary devices, in accordance with certain example embodiments.

Different Categories:

The brokers may be grouped into different predefined categories, e.g., based on the device type that is hosting the broker, whether the broker is mobile or stationary, the services accessible via the brokers, etc. The least cost tree may be calculated for each category based on some or all of the above and/or other policies. For instance, as shown in the FIG. 3 example, all mobile brokers may be grouped into one category, and all stationary brokers may be grouped into a second category. The least cost tree is then calculated, with these groupings in mind.

When a broker in the territory is down, the least cost tree may be updated, thereby helping to ensure that the least-cost path between all connected broker "nodes" is determined and that the number of propagation operations is reduced. This concept is demonstrated using the scenario shown in and described in connection with FIGS. 4-6.

Figure 4:
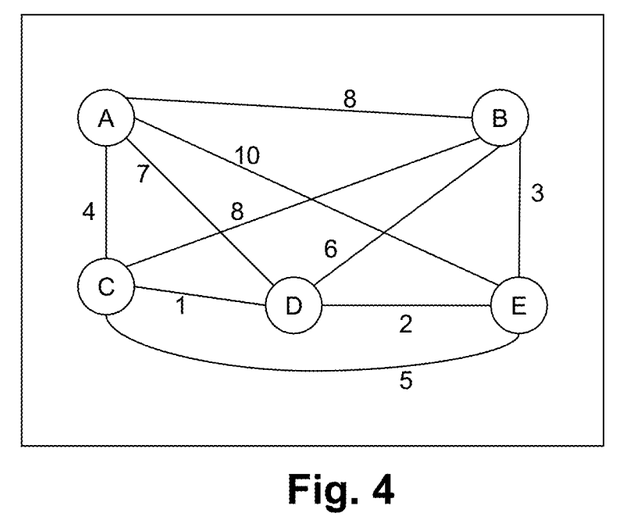
FIGS. 4-6 illustrate an example scenario of how a minimum spanning tree can be maintained and how changes can be propagated when a broker goes down, using the techniques of certain example embodiments.

In this example, brokers A, B, C, D, and E are brokers in an example territory. The brokers are distributed across a variety of geographical locations. FIG. 4 shows broker A's view of the tree, based on geographical distances. The numbers represent edge weights or costs.

Figure 5:
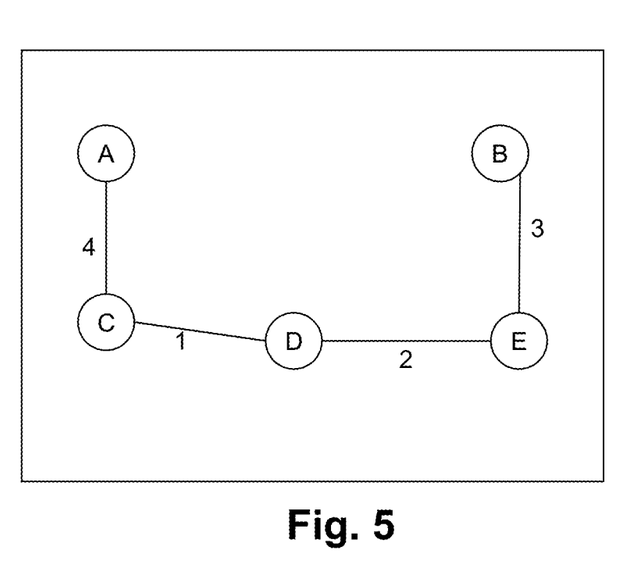

With the aid of processing resources (such as a processor and a memory) provided to an electronic device, broker A is configured to compute its least cost tree using the distance between geographical locations. Using this calculation technique, the least cost tree shown in FIG. 5 is computed.

Figure 6:
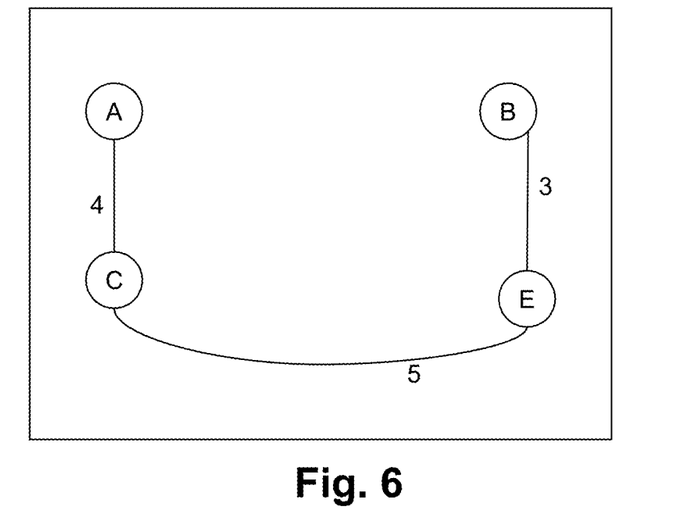

In case a new broker joins or leaves the territory, or in case a broker in the territory goes down, the least cost tree will be updated. For instance, assume that broker D encounters a system failure and cannot be reached. As a result, broker A will update its tree, e.g., as shown in FIG. 6.

If a change is made on broker A, broker A will only propagate its change to its nearest neighboring broker(s). Based on the trees shown in FIGS. 4 and 5, broker A will only propagate its change to broker C, because that is its singular nearest neighbor.

As a result, broker C will find its nearest neighbor using its dynamically constructed least cost tree in order to propagate the change to it. Assuming that broker D is still functional (e.g., as shown in FIG. 5), broker C will propagate the change to broker D. If broker D is down (e.g., as shown in FIG. 6), broker C will not return the data to broker A since broker A originated the information and this would in any event create a cycle. Instead, broker C will propagate the change to broker E. Thus, the change is propagated to all the broker "nodes" along shortest route, while cycles are avoided. In brief, the update event contains the timestamp and the name of the originating broker, so broker C will know that broker A is the source of the event, and broker C therefore will not forward the event to broker A.

To help prevent cycles that would undermine the effectiveness of the application and in any event would prevent the strict mathematical definition of a minimum spanning tree from being met, update events may be provided with their own origin timestamps and the "names" or other identifiers of the broker(s) that originated the update. The identifiers may be, for example, network addresses, GUIDs, UUIDs, and/or the like. Cycles can be detected, for example, by having a broker discard update events that they sent out. In the FIG. 6 example, broker A will discard the update event message from broker C because it will recognize that it was the broker named in the message and that it did in fact send out an update with the associated timestamp. Again, the update event has the timestamp and the name of the source broker (in this case, broker A), so the event will not be propagated to broker A. In this case, broker A need not send a message back to broker C indicating that broker C should send the message to broker E. Alternatively, in some implementations, broker A may send a message back to broker C indicating that broker C should instead send the message to broker E.

Figure 7A:
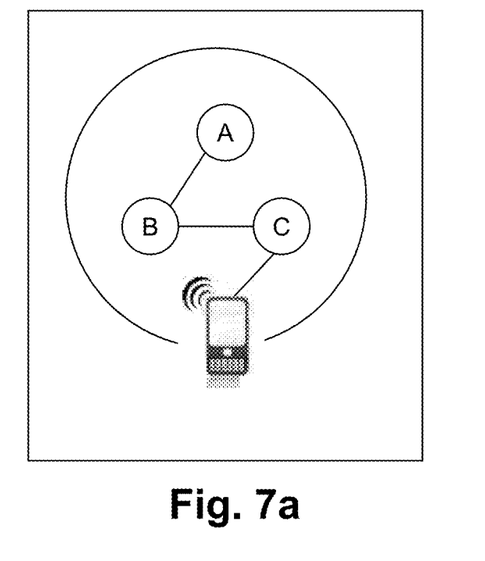
FIGS. 7a-c show different views of an example minimum spanning tree in a scenario in which an update is propagated from a first broker using the techniques of certain example embodiments.
Figure 7B:
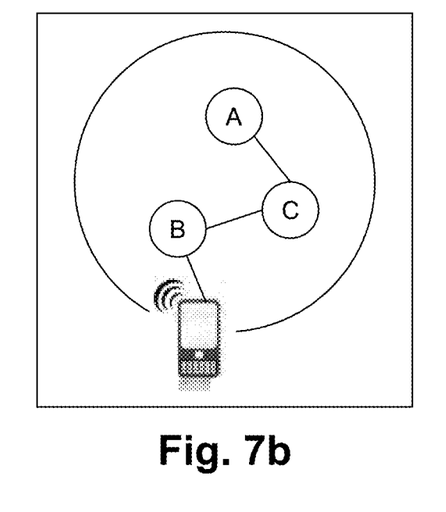
Figure 7C:
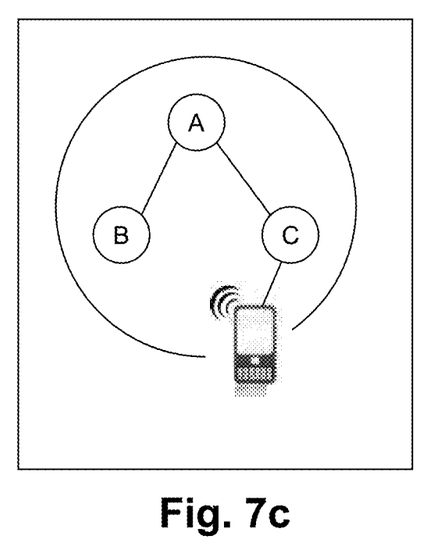

Another example of how a proposed change can be propagated in accordance with the example techniques described herein is described in connection with FIGS. 7a-7c. Assume a system with three brokers, namely, brokers A, B, and C, together with a broker embedded within a mobile device (e.g., according to the mqtt protocol) that also is a part of the territory (e.g., as represented by the mobile device shown in FIGS. 7a-7c), and assume that an administrator wants to perform an update on broker A. A conventional approach would involve broker A sending out updates to both brokers B and C. However, certain example embodiments proceed in a different way. That is, a minimum spanning tree algorithm is run on the network, and updates are propagated to a broker's nearest neighbor(s). Assume further that brokers A, B, and C have views of the least-cost spanning tree that correspond to FIGS. 7a-7c, respectively.

Given these views of the least-cost spanning tree, broker A sends the update event to B, and broker B sends the update event to broker C. According to broker C's view of the least cost tree, its nearest neighbor is broker A. However, this would create a cycle and, in any event, broker A already has received the update event. Indeed, in this scenario, the update event originated with broker A. In accordance with certain example embodiments, by checking the metadata associated with the update event (e.g., the timestamp and/or indication of the originating broker), broker C knows not to forward the update event back to broker A. In certain example embodiments, the determination not to send data back to broker A may be performed in connection with timestamp information. For example, the timestamp on the event update may be checked. If the timestamp is within a predefined period of time (e.g., 20 seconds or any suitable timeframe, which might vary on the size of the network, the size of the update, the number of expected updates, etc.), the event will be discarded; otherwise, it may be forwarded to broker A.

The example embodiments described herein may be useful in a number of different scenarios including, for example, as a deployment solution, for JNDI replication, resynchronizing a restored broker within its territory, etc. For example, when a user wants to deploy the same set of synchronizable assets (e.g., client groups and documents) to several Broker runtimes, the user may put the brokers in a territory. When the user deploys the assets to one broker, the changes may be automatically propagated to other brokers using the least cost tree.

As another example, when a broker is used as a JNDI provider, JNDI admin objects (e.g., connection factories, destinations, and/or the like) may be stored as event types. When a need arises to synchronize the admin objects between many brokers acting as a JNDI provider, for example, it is possible to join the brokers in a territory. Automatic synchronization then may take place using least cost tree algorithm.

As still another example, if a broker server that hosts a broker that is a member of a territory, a restored broker may need to synchronized with the other brokers in the territory. The update for the restored broker will happen from its nearest neighbor in the tree.

As indicated above, example advantages of the exemplary techniques described herein include reliability of propagation and bandwidth optimization. For instance, with respect to the reliability of propagating changes, metadata synchronization typically is considered a time-consuming, administrative activity. An administrative user normally will apply metadata changes to one broker (e.g., broker A) in the territory and will wait for changes to propagate to all of the brokers in the territory, e.g., as broker A itself pushes out all of the changes. But if broker A goes down for some reason while propagating the changes and before the change propagation is complete, some brokers in the territory will not be synchronized, if conventional approaches are implemented. This may cause performance issues and may even in some instances render the environment unusable, as the brokers in the territory will expect to have the same shared metadata even though only some of the brokers will have the updated metadata whereas others will never have received the updated metadata and thus will continue to possess and use the old metadata. Using the techniques of certain example embodiments, however, connecting the brokers in a given territory and/or connecting different territories using least cost tree, a broker will receive its update from its nearest neighbor and will not need to wait for broker A to come back online. The more distributed processing of the updates therefore will help improve the overall reliability of the propagation.

Another example of how reliability of propagation can be improved can be demonstrated in circumstances where brokers fail in a manner that essentially is out of phase with one another. Assume, for instance, that there are three brokers in a territory, namely, brokers A, B, and C, and that broker C is down when a metadata changes is made on broker A. Using conventional techniques, broker A will be responsible for updating all of the brokers in its territory with the changes made on it. Broker A will propagate changes to Broker B. It will not, however, propagate any changes to broker C because broker C is down. In theory, when broker C comes online again, broker A will try to send the changes to broker C. But assume that broker A goes down when broker C comes back up. Because broker A is responsible for distributing the changes made thereto, and broker C will have no way of getting the changes, as broker A is down. Indeed, broker C might not even know that any changes were made on broker A. In contrast, in certain example embodiments, broker C will get its changes from its nearest neighbor, e.g., as indicated in the minimum spanning tree. Distributing the responsibility for passing out or around updates thus helps improve reliability, e.g., by removing the single point of failure from the system.

With respect to advantages related to bandwidth optimization, it is when a metadata update is made on one broker in the territory (broker A in this example), an update event conventionally is created and sent by broker A to all of the other brokers in the territory. If broker A is in territory with four other brokers, then broker A will send the same update event to four other brokers. This means that the available bandwidth will be split between four transfers from the source (broker A), and the overall network bandwidth will not be used efficiently. In contrast, using the techniques of certain example embodiments, broker A will only pass update events to its nearest neighbor, which may in some instances be dynamically computed. As a result, bandwidth utilization will be more distributed throughout the network and bottlenecks and the like may be less likely to occur.

Figure 8:
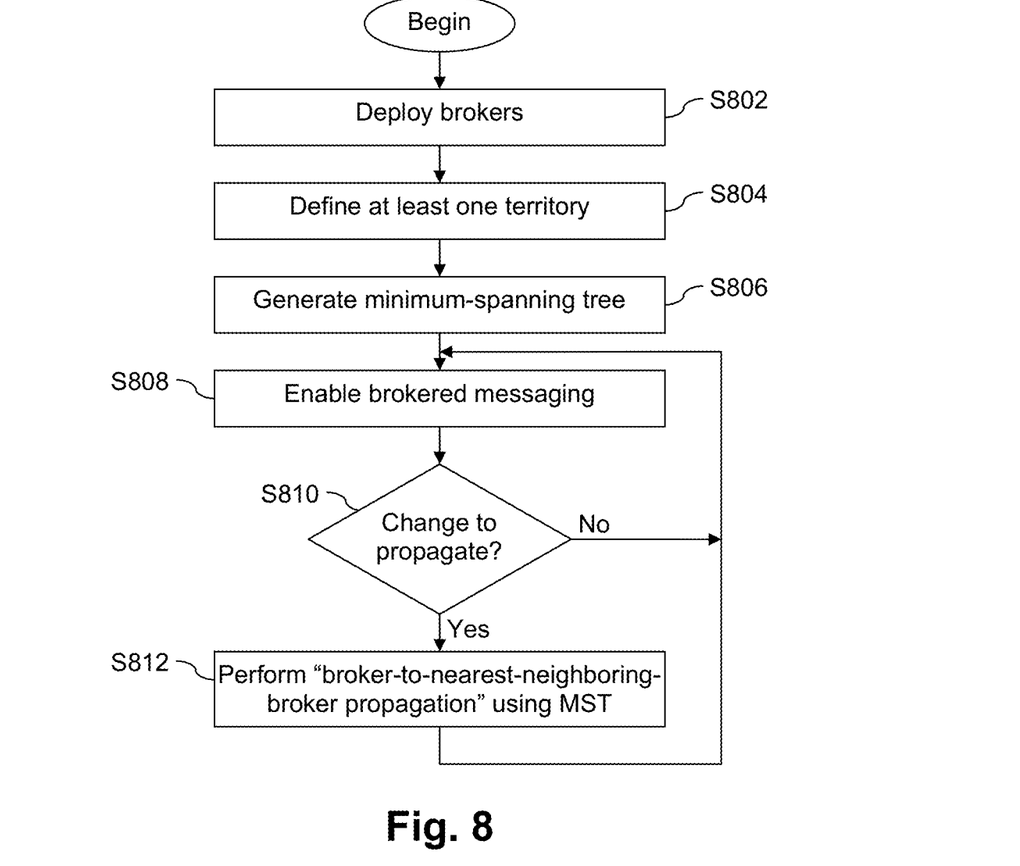
FIG. 8 is a flowchart showing an illustrative process for deploying and managing a network computer system including brokers in one or more territories in accordance with certain example embodiments.

FIG. 8 is a flowchart showing an illustrative process for deploying and managing a network computer system including brokers in one or more territories in accordance with certain example embodiments. Brokers are deployed in step S802 and divided into one or more territories in step S804 based on any suitable criteria (e.g., geography, service(s) provided, traffic-related considerations, etc.). A minimum spanning tree is generated for each generated territory in step S806, and potentially across territories in certain example embodiments. The edge weights used in generating the MSTs are based on any suitable criteria such as, for example, the factors explained above. Brokered messaging, service provision, and/or the like, is enabled in step S808. If there are no changes to be propagated (e.g., if none of the brokers are updated, if none of the brokers are taken down or go down, if no new brokers are deployed, etc.), e.g., as determined in step S810, then the process loops back to step S808. On the other hand, if there is a change to propagate through a territory and/or across multiple territories, broker-to-nearest-neighboring-broker propagation is performed in connection with the appropriate MST(s) in step S812. Although not expressly shown, brokered messaging may be terminated, thus resulting in an end to the process shown in FIG. 8, e.g., in and/or around step S808.

Figure 9:
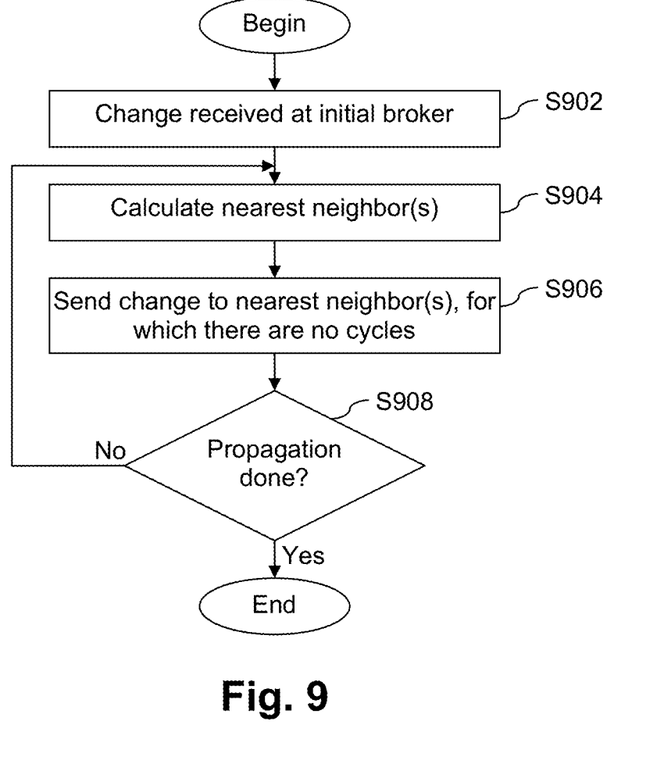
FIG. 9 is a flowchart showing an illustrative process for propagating a change in accordance with certain example embodiments.

FIG. 9 is a flowchart showing an illustrative process for propagating a change in accordance with certain example embodiments. In step S902, a change is received at an initial broker. This change may cause an update event message to be generated. The message may include metadata such as, for example, a timestamp associated with the event, the name of the initiated broker, etc. The initiating broker may determine its nearest neighbor(s) in step S904. This determination may be performed dynamically, e.g., in accordance with a distributed MST algorithm or the like, and/or it may be based on a previously generated MST calculation that has been pushed out across the network ahead of time. In step S906, based on the determination, the message indicative of the change may be sent to the nearest neighbors for which there are no cycles. A check as to whether there is a cycle may be made in accordance with the example techniques described above, as aided by (for example) metadata included with the message (including the timestamp and/or broker of origin). If there are no more brokers to update, e.g., as determined in step S908, the propagation is considered complete, and brokered messaging/servicing is enabled (e.g., in accordance with step S808 as indicated above). On the other hand, if there are more brokers to be updated, the process loops back to step S904, essentially performing the same process in a distributed manner at each broker in the implicated territory or territories.

It will be appreciated that certain example embodiments may develop MSTs that notion that MSTs that extend across territories. For example, it is known to link together territories using a gateway. To provide a working environment, it oftentimes is desirable to help ensure that the territories linked by the gateway are synchronized with one another. Thus, the techniques described herein can generate an MST across territories linked by a gateway, e.g., to help provide for efficient change propagation across territories. In an example use case, an administrator may perform an update on a broker in one territory and, as a result, the change may needs to be propagated within the territory, as well as across the gateway to a remote territory, otherwise the synchronization will be lost and documents will not flow across the gateway. Thus, an MST may be generated, e.g., treating each gateway as an edge and each territory as a node for change propagation purposes. Once a given territory at a more macro level has received the change, that change may be applied within the given territory. It will be appreciated that a similar concept may be used to propagate changes to gateways, as well. It also will be appreciated that the ability to expand the example embodiments discussed herein to cover multiple territories and/or gateways helps demonstrate the elastic and expandable/scalable aspects of the instant disclosure.

Any suitable minimum spanning tree algorithm may be used in connection with the example embodiments described herein. For instance, Borůvka's algorithm, Prim's algorithm, Kruskal's algorithm, and/or the like may be used in different example embodiments. Distributed MST algorithms (such as, for example, the GHS algorithm) also may be used in certain example embodiments, e.g., to construct the construct the MST in accordance with an asynchronous message-passing model. Care may be taken to ensure that there are no orphaned nodes or other problems in certain example embodiments. It will be appreciated, however, that any algorithm that finds the nearest neighbor may be used in different example embodiments.

As used herein and is understood by those skilled in the art, territories and clusters are different concepts. Clusters may be thought of as including a set of loosely connected or tightly connected computers that work together so that they can in many respects be viewed as a single system. It is noted that the territories as described herein typically will have no master/slave relationship and, as indicated above, "equal" brokers in certain example implementations help distribute the changed metadata. One further difference as between territories and clusters may relate to the way in which clusters oftentimes are set up and run (e.g., apart from the master/slave concept) and, more particularly, to the notion of typically using clusters to distribute workload and solve performance and/or reliability issues with a system, as these concepts generally are not associated with what a territory does. For instance, a territory may use a set of brokers to distribute the workload, and also frequently may involve a message, document, or the like, being published to all subscribers across all brokers at the same time, e.g., such that a publisher client only has to publish to a nearest (or any) broker, with the system ensuring that subscriber clients in the group (allowed to receive the publication) can access it from its nearest (or any) broker in the territory (or even through a territory gateway to another territory). To provide this functionality, as described above, certain example embodiments help keep the brokers synchronized, e.g., regarding changes to their metadata (such as, for example, clients in a group, newly published items, recently consumed items, etc.).

In a related vein, it will be appreciated that the brokers that have formed a territory may in certain example implementations be a part of one or more separate clusters, e.g., since a part of the distinction between territories and clusters can relate to their roles and/or functions. For instance, in an example implementation, brokers can be a part of a cluster for standard broker messaging, etc., to solve the problem of load balancing while also being in a territory to solve the problem of automatic distribution of changes (e.g., as described above), without the cluster and territory being coextensive in scope.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of managing operations of a computer network in which a plurality of broker servers located at different respective geographical locations are divided into one or more distinct broker server territories, the method comprising:

calculating a minimum spanning tree (MST) for a spanning tree that is represented by the plurality of broker servers, which includes a first broker server, in the one or more distinct broker server territories, enabling brokered messaging and/or service provision using the plurality of broker servers in the computer network, the brokered messaging and/or service provision including at least:

receiving, at the first broker server of the plurality of broker servers, an electronic data message from a first publishing computing device that is different from any of the plurality of broker servers;

performing, based on the electronic data message and with processing resources of the first broker server, a determination of which of plural subscribing computing devices that the electronic data message will be sent, the plural subscribing computing devices being different from the plurality of broker servers; and sending the electronic data message based on the determination;

in response to a change being made to the first broker server, propagating a message indicative of the change to other ones of the plurality of broker servers, the message being propagated to other ones of the plurality of broker servers in accordance with the calculated MST.

2. The method of claim 1, wherein calculating the MST is performed in response to a new territory being formed.

3. The method of claim 1, wherein calculating the MST is performed in response to a change being made to one of the plurality of broker servers such that nearest neighbors for the one broker server in the territory in which the change is being made are determined dynamically.

4. The method of claim 1, wherein the calculating is performed both (a) in response to a new territory being formed and (b) dynamically once a change has been made on a broker server in a given territory.

5. The method of claim 1, wherein there is no master-slave relationship between any of the plurality of broker servers in the territories for purposes of propagating any changes made to any one of the plurality of broker servers.

6. The method of claim 1, wherein the message comprises metadata including a timestamp associated with the change, as well as an identifier of the first broker server.

7. The method of claim 1, further comprising:
as part of the propagation of the message, determining based on metadata associated with the message whether a cycle would be created if the message were propagated to a nearest neighbor; and
preventing the cycle from being created based on the determination.

8. The method of claim 7, wherein the metadata includes a timestamp associated with the change and/or an identifier of the first broker server that was changed.

9. The method of claim 1, wherein edge weights for the minimum spanning tree are based on at least one of:
ping time responses between connected broker server pairs;
geographical distances between connected broker server pairs;
whether connected broker server pairs are either in a common LAN or separated by a WAN;
whether connected broker server pairs are either mobile or stationary; and
which connected broker server pairs belong to a common one of a plurality of predefined categories.

10. The method of claim 1, wherein edge weights for the minimum spanning tree are based on at least two of:
ping time responses between connected broker server pairs;
geographical distances between connected broker server pairs;
whether connected broker server pairs are either in a common LAN or separated by a WAN;
whether connected broker server pairs are either mobile or stationary; and
which connected broker server pairs belong to a common one of a plurality of predefined categories.

11. The method of claim 1, wherein each one of the plurality of broker servers includes processing resources including at least one processor and a memory, the processing resources being configured perform calculation of the MST, and wherein the brokered messaging and/or service provision is enabled for requesting client computer systems.

12. A computer-mediated network system, comprising:
a plurality of brokers located at different respective geographical locations, the plurality of brokers being divided into one or more distinct broker territories;
wherein each one of the plurality of brokers comprises processing resources including at least one processor and a memory, the processing resources for each one of the plurality of brokers, being configured to:
calculate a minimum spanning tree (MST) for a spanning tree that is represented by the plurality of brokers, which includes a first broker, in the one or more distinct broker territories; and
cooperate with other brokers with a territory in order to provide brokered messaging and/or services to requesting client computer systems, the brokered messaging and/or service provision including at least:
receiving, at the first broker of the plurality of brokers, an electronic data message from a first publishing computing device, which is different from any of the plurality of brokers;
performing, based on the electronic data message and with the processing resources of the first broker, a determination of which of plural subscribing of computing devices that the electronic data message will be sent, the plural subscribing computing devices being different from the plurality of brokers; and
sending the electronic data message based on the determination;
in response to a change being made to the first broker, propagate a message indicative of the change to other ones of the plurality of brokers, the message being propagated to other ones of the plurality of brokers in accordance with the calculated MST.

13. The system of claim 12, wherein calculation of the MST is performed in response to a new territory being formed and/or dynamically once the change has been made to the first broker.

14. The system of claim 12, wherein the message includes metadata that includes timestamps associated with the change and an identifier of the first broker that has been changed.

15. The system of claim 12, wherein edge weights for the minimum spanning tree are based on at least one of:
ping time responses between connected broker pairs;
geographical distances between connected broker pairs;
whether connected broker pairs are either in a common LAN or separated by a WAN;
whether connected broker pairs are either mobile or stationary; and
which connected broker pairs belong to a common one of a plurality of predefined categories.

16. The system of claim 12, wherein edge weights for the minimum spanning tree are based on at least two of:
ping time responses between connected broker pairs;
geographical distances between connected broker pairs;
whether connected broker pairs are either in a common LAN or separated by a WAN;
whether connected broker pairs are either mobile or stationary; and
which connected broker pairs belong to a common one of a plurality of predefined categories.

17. The system of claim 12, wherein, following initial network setup, no master-slave relationships exist between any of the plurality of brokers for purposes of propagating changes made to any one of the plurality of brokers.

18. A first broker server for use in a computer-mediated network system comprising a plurality of broker servers located at different respective geographical locations and being divided into one or more distinct broker server territories, the first broker server comprising:
- at least one computer processor,
- a memory; and
- instructions stored on a non-transitory computer readable storage medium, performable in connection with the at least one computer processor and the memory, to at least:
  - calculate a minimum spanning tree (MST) for a spanning tree that is represented by the plurality of broker servers, which includes a first broker server, in the one or more distinct broker server territories;
  - cause the first broker server to cooperate with other one of the plurality of broker servers in a territory to provide brokered messaging and/or services to requesting client computers, the brokered messaging and/or service provision including at least:
    - receiving, at the first broker server of the plurality of broker servers, an electronic data message from a first publishing computing device that is different from any of the plurality of broker servers,
    - performing, based on the electronic data message and with the at least one computer processor, a determination of which of plural subscribing computing devices that the electronic data message will be sent, the plural subscribing computing devices being different from the plurality of broker servers, and
    - sending the electronic data message based on the determination;
  - receive a direct change command from an authorized user;
  - in response to a received direct change command, distribute, in accordance with the calculated MST, a first message indicative of the received direct change command to a second broker server that is considered a nearest neighbor of the first broker server to thereby update the second broker server and cause the second broker server to distribute, in accordance with the calculated MST, the first message indicative of the received direct change command to a third broker server in the territory;
  - receive an indirect change command from an authorized user via an intermediary broker server, and
  - in response to a received indirect change command, distribute, in accordance with the calculated MST, a second message indicative of the received indirect change command to the second broker server that is considered a nearest neighbor to the first broker server, so that the second broker server is updated and caused to distribute, in accordance with the calculated MST, the second message to a third broker server in the territory, wherein no master-slave relationships exist as between any of the plurality of broker servers in the territory for purposes of propagating changes made to any one of the plurality of broker servers within the territory.

19. A method of operating a computer network in which a plurality of broker servers located at different respective geographical locations are divided into one or more distinct broker server territories, the method comprising:
- calculating a minimum spanning tree (MST) for a spanning tree that is represented by the plurality of broker servers, which includes a first broker server, in the one or more distinct broker server territories, where each one of the plurality of broker servers is connected, in the spanning tree, to another one of the plurality broker servers by a weighted edge; and
- in response to a change being made to the first broker server, propagating, based on the calculated MST, a message indicative of the change to other ones of the plurality of broker servers by causing each one of the plurality of broker servers, starting with the first broker server, to distribute the message, wherein no master-slave relationships exist as between any of the plurality of broker servers in a territory for purposes of propagating changes made to the plurality of broker servers in the territory, and wherein each of the weighted edges for the spanning tree has a weight that is based on at least two of:
- ping time responses between connected broker servers pairs;
- geographical distances between connected broker servers pairs;
- whether connected broker server pairs are either in a common LAN or separated by a WAN;
- whether connected broker server pairs are either mobile or stationary; and
- whether connected broker server pairs belong to a common one of a plurality of predefined categories.

20. A non-transitory computer-readable storage medium tangibly storing instructions that, when executed by a processor of a broker server, perform a method according to claim 19.

* * * * *